(12) United States Patent
Gilmore et al.

(10) Patent No.: US 11,751,180 B2
(45) Date of Patent: *Sep. 5, 2023

(54) TRANSMIT FILTER BYPASS MODE SCANNING

(71) Applicant: QUALCOMM Incorporated, San Diego, CA (US)

(72) Inventors: Robert Gilmore, Poway, CA (US); Daniel Filipovic, Solana Beach, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,671

(22) Filed: Jul. 30, 2021

(65) Prior Publication Data

US 2023/0013482 A1    Jan. 19, 2023

Related U.S. Application Data

(63) Continuation of application No. 16/572,245, filed on Sep. 16, 2019, now Pat. No. 11,109,377.

(51) Int. Cl.
*H04W 72/0453* (2023.01)
*H04W 40/24* (2009.01)
*H04W 76/28* (2018.01)
*H04W 72/1263* (2023.01)

(52) U.S. Cl.
CPC ..... *H04W 72/0453* (2013.01); *H04W 40/244* (2013.01); *H04W 72/1263* (2013.01); *H04W 76/28* (2018.02)

(58) Field of Classification Search
CPC ............ H04W 16/14; H04W 72/0453; H04W 72/1263; H04W 76/28; H04W 88/06
See application file for complete search history.

(56) References Cited

U.S. PATENT DOCUMENTS

| | | |
|---|---|---|
| 11,109,377 B2 | 8/2021 | Gilmore et al. |
| 2012/0009886 A1 | 1/2012 | Poulin |
| 2013/0155931 A1 | 6/2013 | Prajapati et al. |
| 2013/0225107 A1* | 8/2013 | Lane ............... H04B 1/0475 455/234.1 |
| 2014/0302865 A1 | 10/2014 | Bai et al. |
| 2018/0048345 A1* | 2/2018 | Pehlke ............ H04B 1/40 |
| 2021/0067186 A1* | 3/2021 | Beaudin ........... H04B 1/401 |

\* cited by examiner

*Primary Examiner* — Pao Sinkantarakorn
(74) *Attorney, Agent, or Firm* — Alan Gordon

(57) ABSTRACT

A user equipment (UE) may communicate using different radio access technologies on adjacent frequency bands. The UE may determine that the UE is not receiving wireless signals for a second radio access technology that utilizes a second frequency band adjacent to a first frequency band for a first radio access technology. The UE may place a transmitter of the UE in a filter bypass mode in which a transmit signal bypasses a transmit filter for the first radio access technology in response to determining that the wireless signals for the second radio access technology are not received. The UE may scan, using a receiver for the second radio access technology, while in the filter bypass mode, the second frequency band for a signal for the second radio access technology between scheduled transmissions for the first radio access technology.

30 Claims, 11 Drawing Sheets

TRANSMIT FILTER BYPASS MODE SCANNING

CROSS REFERENCES

The present Application for Patent is a Continuation of, and claims the benefit and priority to, U.S. patent application Ser. No. 16/572,245, entitled "TRANSMIT FILTER BYPASS MODE SCANNING," filed Sep. 16, 2019, which is assigned to the assignee hereof, and expressly incorporated by reference herein in its entirety.

BACKGROUND

Technical Field

The present disclosure relates generally to communication systems, and more particularly, to scanning while in a transmit filter bypass mode.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and apparatuses are provided. For example, a method of wireless communication may include determining that a user equipment (UE) is not receiving wireless signals for a second radio access technology that utilizes a second frequency band adjacent to a first frequency band for a first radio access technology. The method may include placing a transmitter of the UE in a filter bypass mode in which a transmit signal bypasses a transmit filter for the first radio access technology in response to the determining. The method may include scanning, by a receiver for the second radio access technology, while in the filter bypass mode, the second frequency band for a signal for the second radio access technology between scheduled transmissions for the first radio access technology.

In an aspect, the scanning includes: transmitting a probe request for the second radio access technology; and listening for a probe response based on the second radio access technology. The probe request may be transmitted when there is no downlink transmission directed to the UE.

In an aspect, the scanning includes: determining that the UE is not scheduled on the first radio access technology during a period of time; and listening for the signal for the second radio access technology during the period of time. Determining that the UE is not scheduled on the first radio access technology during the period of time may include at least one of receiving a control channel indicating no uplink transmission for the UE for the period of time or receiving a control channel indicating no downlink transmission for the UE for the period of time. Additionally or alternatively, the method may include receiving one or more discontinuous reception (DRX) configuration parameters for the first radio access technology, and determining that the UE is not scheduled on the first radio access technology during the period of time may include detecting a DRX off period based on at least the one or more DRX configuration parameters. The scanning may further include listening for a Wi-Fi beacon during the DRX off period.

In an aspect, the scanning may include: waiting for a configured time period after a previous scan; and scanning at a next opportunity following the configured time period.

In an aspect, the first frequency band is an LTE band 41 at 2496 to 2690 MHz and the second frequency band is a Wi-Fi band at 2400-2483 MHz.

In another aspect, the first frequency band is a NR band 91 at 4.4 GHz to 5 GHz and the second frequency band is a Wi-Fi band at 5.15 GHz to 8.835 GHz.

In an aspect, the UE is configured to satisfy a spectrum emission requirement for the first radio access technology while in the filter bypass mode.

In another aspect, the disclosure provides an apparatus for wireless communication including a memory storing computer executable code and at least one processor coupled with the memory and configured to execute the code. The at least one processor may be configured to determine that a UE is not receiving wireless signals for a second radio access technology that utilizes a second frequency band adjacent to a first frequency band for a first radio access technology. The at least one processor may be configured to place a transmitter of the UE in a filter bypass mode in which a transmit filter is bypassed by a transmit signal for the first radio access technology in response to the determining. The at least one processor may be configured to scan, by a receiver for the second radio access technology, while in the filter bypass mode, the second frequency band for a signal for the second radio access technology between scheduled transmissions for the first radio access technology.

In another aspect, the disclosure provides an apparatus for wireless communication. The apparatus may include means for determining that a UE is not receiving wireless signals for a second radio access technology that utilizes a second frequency band adjacent to a first frequency band for a first radio access technology. The apparatus may include means for placing a transmitter of the UE in a filter bypass mode in which a transmit filter is bypassed by a transmit signal for the first radio access technology in response to the determining. The apparatus may include means for scanning, by a receiver for the second radio access technology, while in the filter bypass mode, the second frequency band for a signal for the second radio access technology between scheduled transmissions for the first radio access technology.

In another aspect, the disclosure provides a non-transitory computer-readable medium storing computer executable code. The code when executed by a processor causes the processor to determine that a UE is not receiving wireless signals for a second radio access technology that utilizes a second frequency band adjacent to a first frequency band for a first radio access technology. The code when executed by a processor causes the processor to place a transmitter of the UE in a filter bypass mode in which a transmit signal bypasses a transmit filter for the first radio access technology in response to the determining. The code when executed by a processor causes the processor to scan, by a receiver for the second radio access technology, while in the filter bypass mode, the second frequency band for a signal for the second radio access technology between scheduled transmissions for the first radio access technology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
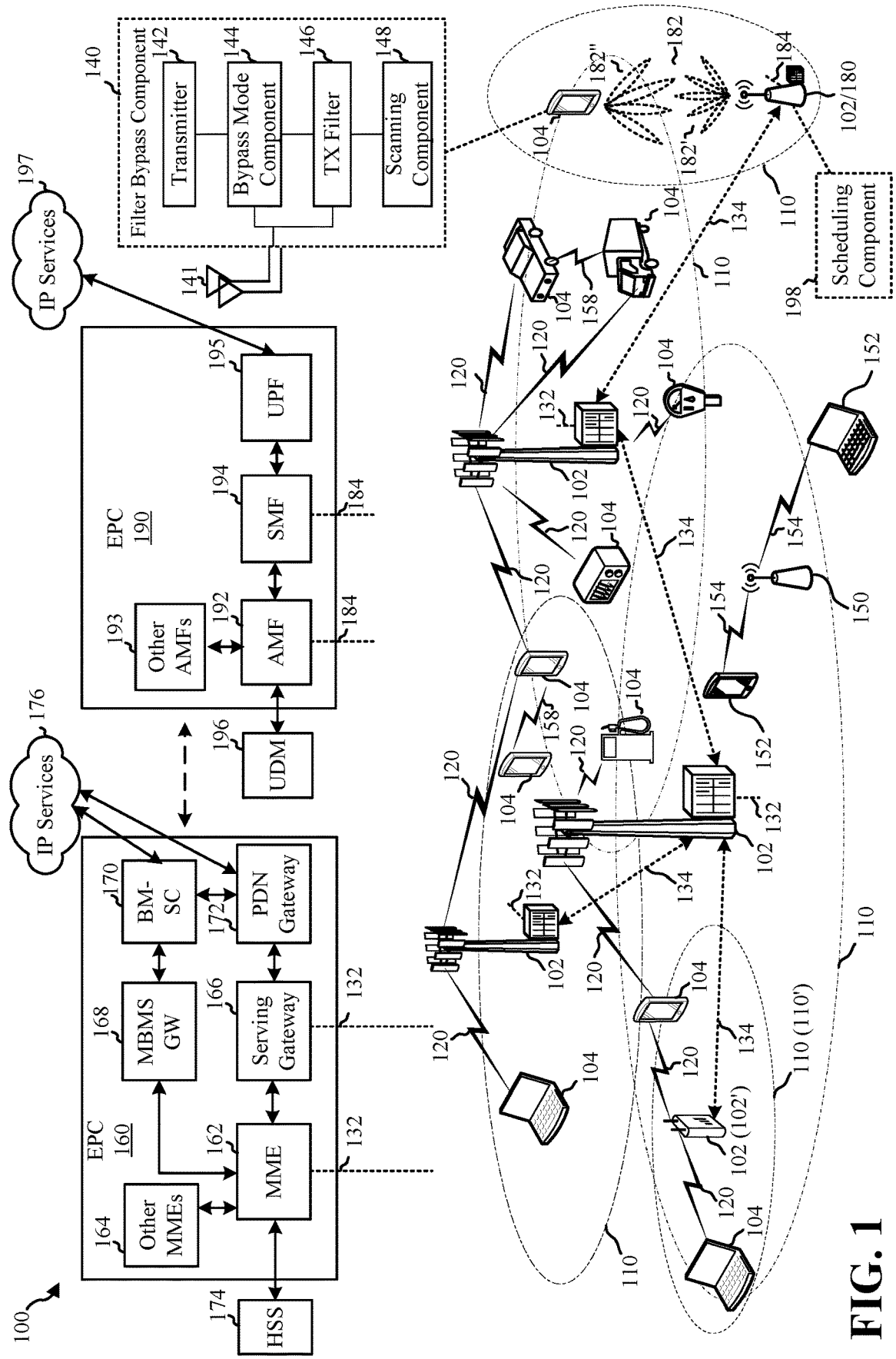
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A wireless device may operate using two or more radio access technologies (RATs). Generally, radio frequency (RF) spectrum is licensed such that frequency bands for different RATs do not overlap. RF energy from one frequency band, however, may leak into an adjacent frequency band. A wireless device capable of operating on RATs in adjacent frequency bands may experience self-jamming when the RF energy from a transmitter of a first RAT on a first frequency band leaks into an adjacent second frequency band for a second RAT and saturates the receiver. A wireless device may include a transmit filter that reduces energy leakage into an adjacent frequency band of the second RAT. Such transmit filters, however, may be expensive in terms of insertion loss and power consumption. A wireless device may decrease the additional transmit power required to overcome the insertion loss of a transmit filter by bypassing the transmit filter for the first RAT when the second RAT is inactive.

Determining whether the second RAT is inactive may be complicated when the transmit filter is disabled. For example, an access point (AP) may broadcast a beacon to signal the availability of the AP for the second RAT. When the wireless device is in a filter bypass mode, transmissions for the first RAT may jam the receiver for the second RAT from receiving the beacon. Accordingly, the wireless device may not become aware of the AP and may remain in the filter bypass mode despite the availability of the AP for the second RAT.

In an aspect, the present disclosure provides techniques for scanning for a signal for a second RAT when a wireless device is in a filter bypass mode for the first RAT. The wireless device may take advantage of a time division duplexing (TDD) frame structure of the first RAT to opportunistically scan for the signal when the wireless device is not transmitting or receiving on the first frequency band for the first RAT. For instance, the wireless device may actively scan for the second RAT using a probe request during an unscheduled period of the first RAT. The unscheduled period of the first RAT could be one or more unscheduled downlink slots, or one or more unscheduled uplink slots. For longer opportunities such as when connected-mode discontinuous reception (C-DRX) is enabled, the wireless device may actively scan using a probe request, or passively listen for the beacon during the OFF period of any DRX cycle. Accordingly, the wireless device may detect an AP for the second RAT and deactivate the filter bypass mode (e.g., apply the RF filter).

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC)) 190). The base stations 102 may include macrocells (high power cellular base station) and/or small cells (low power cellular base station). The macrocells include base stations. The small cells include femtocells, picocells, and microcells.

In an aspect, a UE 104 may include a filter bypass component 140 that determines whether to bypass a transmit filter on a first frequency band for a first RAT based on presence of an AP for a second RAT on an adjacent second frequency band. The filter bypass component 140 may include a transmitter 142 that generates a signal for transmission; a bypass mode component 144 that bypasses a TX filter 146 when in a filter bypass mode; the TX filter 146 that filters the signal for transmission when not in the filter bypass mode (e.g., in a filtered mode); and a scanning component 148 that opportunistically scans for a signal for the second RAT while the bypass mode component 144 is in the bypass mode. The filter bypass component 140 may be coupled with one or more antennas 141 that transmit the signal for transmission and/or receive a signal for the second RAT. The antenna 141 may include one or more antennas, antenna elements, and/or antenna arrays. Accordingly, the scanning component 148 may determine the availability of an AP for the second RAT while the UE 104 is operating in the filter bypass mode and change to the filtered mode for communication using the second RAT. By scanning for the second RAT while in the filter bypass mode, the filter bypass component 140 may allow the UE 104 to stay in the filter bypass mode for a longer duration and save power while still facilitating connection to the second RAT when an AP is available.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless. In an aspect, one or more of the base stations 102 may include a scheduling component 198 that schedules a UE 104 with downlink TDD slots or subframes that may be used for scanning for a AP while the UE is in a filter bypass mode.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
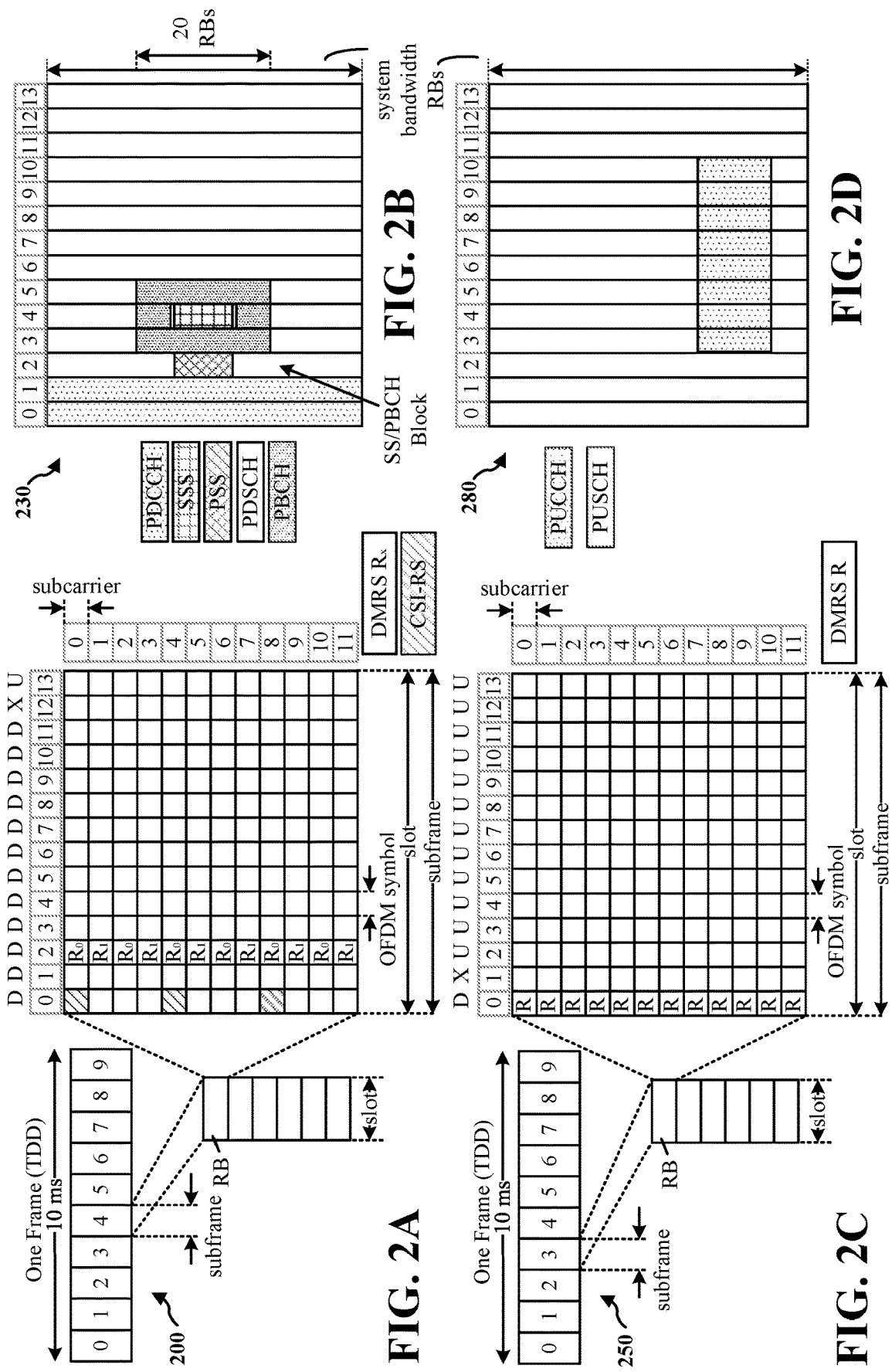
FIG. 2A is a diagram illustrating an example of a first 5G/NR frame.
FIG. 2B is a diagram illustrating an example of DL channels within a 5G/NR subframe.
FIG. 2C is a diagram illustrating an example of a second 5G/NR frame.
FIG. 2D is a diagram illustrating an example of a UL channels within a 5G/NR subframe.

FIGS. 2A-2D are resource diagrams of example frame structures and channels that may be used for 5G NR communications by a UE 104 including a filter bypass component 140. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe.

Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
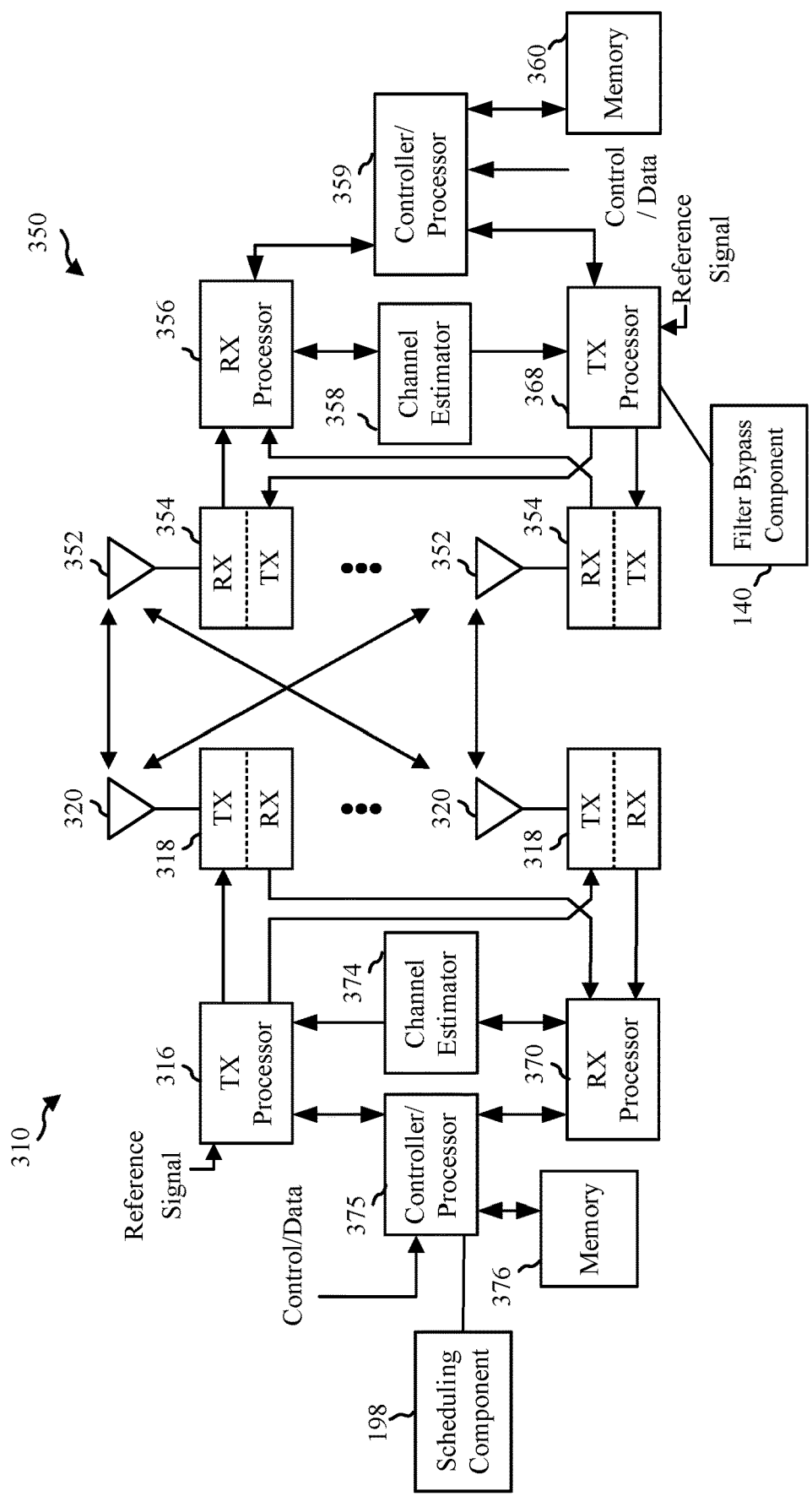
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. For example, in an aspect, the base station 310 may include a scheduling component 198 that schedules downlink subframes or slots for the UE 104 to use for scanning for a signal for a second RAT.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the filter bypass component 140 of FIG. 1 at the UE 104.

Figure 4:
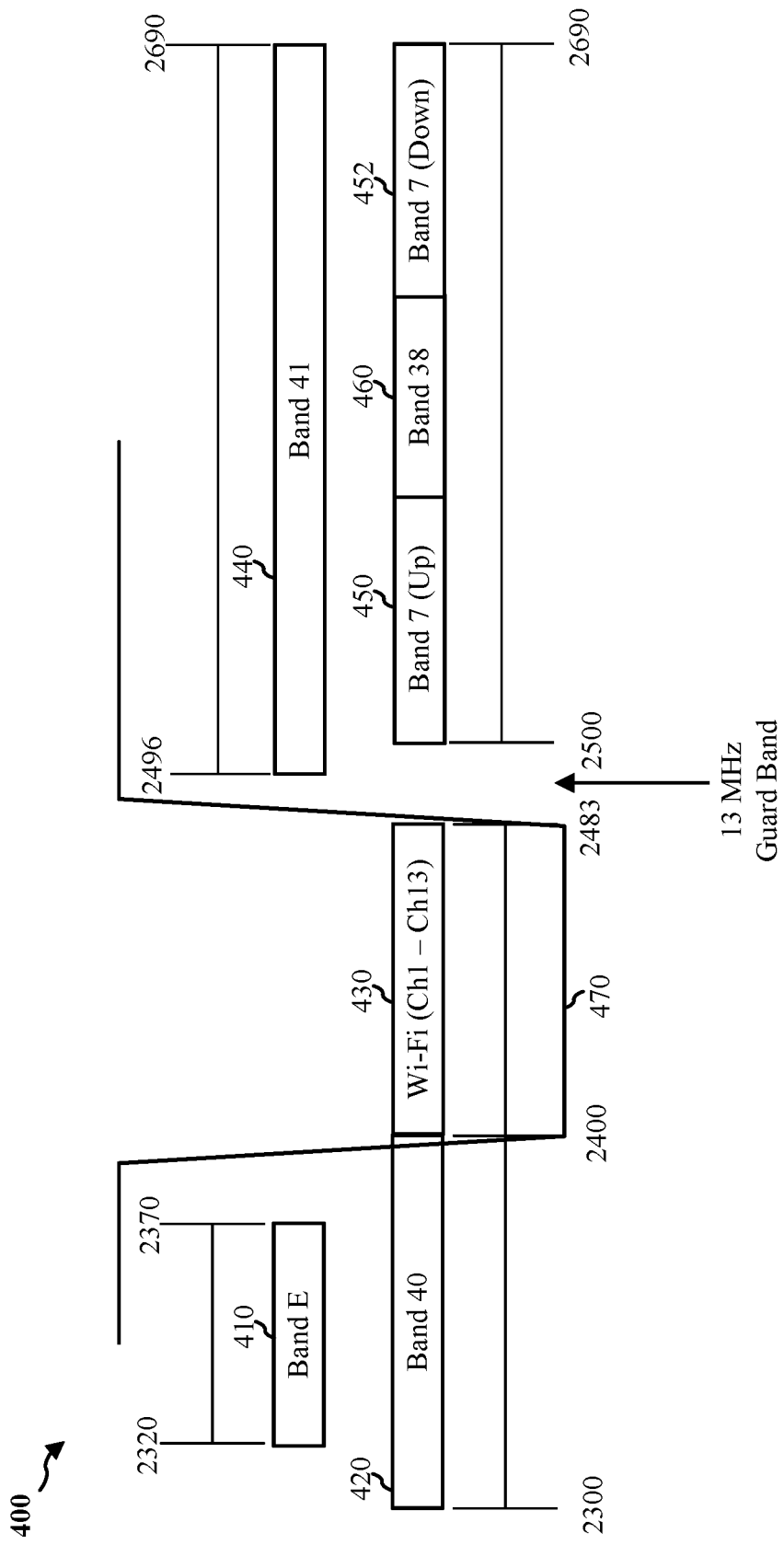
FIG. 4 is a resource diagram of a first set of example frequency bands where a transmit filter may be used.

FIG. 4 is a diagram 400 of example frequency bands where the filter bypass component 140 may operate. A Band E 410 may be defined between 2320 MHz and 2370 MHz. An LTE band 40 420 may be defined between 2300 MHz and 2400 MHz. A Wi-Fi band 430 may be defined between 2400 MHz and 2483 MHz. An LTE band 41 440 may be defined between 2496 MHz and 2690 MHz. An LTE band 7 may be an FDD band defined between 2500 MHz and 2690 MHz and include an up band 450 and a down band 452, while an LTE TDD band 38 460 may be defined in the same range.

In an aspect, a wireless device may operate on the LTE band 41 440 as a first RAT and operate on the Wi-Fi band 430 as a second RAT. The separation between the LTE band 41 440 and the Wi-Fi band 430 may allow some leakage of energy from the LTE band 41 440 into the Wi-Fi band 430. A wireless device that operates in a first RAT such as LTE and a second RAT such as Wi-Fi may use a filter 470 to protect the Wi-Fi band 430 from interference from the adjacent LTE bands. Generally speaking, the filter 470 may be a low pass filter on the Wi-Fi band 430 (that is, having low pass filter response over frequency within the Wi-Fi band 430), which filters out interference from transmissions on the adjacent LTE bands. In particular, such a low pass filter may be implemented as a notch or band rejection filter with respect to the Wi-Fi band 430. The filter 470 may be a transmit filter that has a steep filter requirement to protect the Wi-Fi band 430. For example, the filter 470 may be implemented as a bulk acoustic wave (BAW) filter that rejects transmissions into the Wi-Fi band 430. In other examples, the filter 470 may be implemented as a film bulk acoustic wave (FBAR) filter. As such, the filter 470 may be associated with an insertion loss. In some implementations, the insertion loss associated with the filter 470 may be approximately 2-3 dB. In an aspect, a wireless device may save significant power by bypassing the filter 470 if the Wi-Fi band is not being used. If the insertions loss is 3 dB, 50% of the transmit power is dissipated in the filter. If the insertion loss is 2 dB, 37% of the transmit power is dissipated in the filter. The dissipated transmit power is usually compensated for by a higher transmit power into the filter, hence increased power consumption, increased temperature, and possibly reduced reliability. In an aspect, transmissions in the lower part of band 41 440 may be most likely to interfere with the Wi-Fi band 430, particular those Wi-Fi channels closest to the band 41 440. Transmissions that are further separated in frequency from the victim Wi-Fi channels may not require the transmit filter 470.

Figure 5:
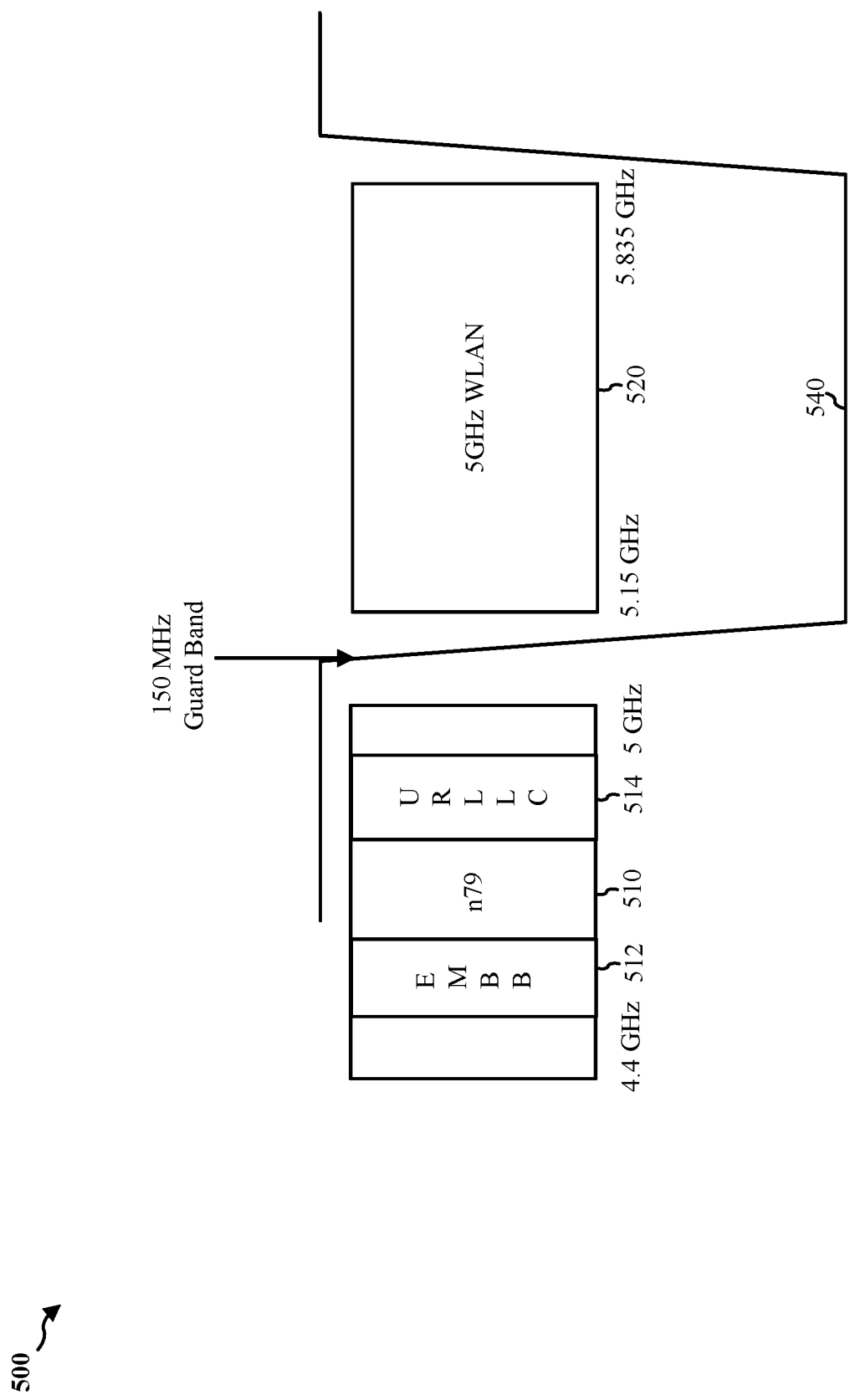
FIG. 5 is another resource diagram a second set of example frequency bands where a transmit filter may be used.

FIG. 5 illustrates another diagram 500 of example frequency bands where the filter bypass component 140 may operate. A 5G NR n79 band 510 may be defined between 4.4 GHz and 5 GHz. In an aspect, the 5G NR n79 band 510 may include an enhanced mobile broadband (EMBB) band 512 and an ultra-reliable low latency communications (URLLC) band 514. A 5 GHz WLAN (e.g., Wi-Fi) band 520 may be defined between 5.15 GHz and 5.835 GHz. Accordingly, a guard band between the 5G NR n79 band 510 and the 5 GHz WLAN band 520 may be 150 MHz.

In an aspect, a wireless device operating on both of the 5G NR n79 band 510 and the 5 GHz WLAN band 520 may utilize a transmit filter 540 to protect the 5 GHz WLAN band 520. Similar to the filter 470 discussed above, the filter 540 may have steep filter requirements that result in an insertion loss.

Figure 6:
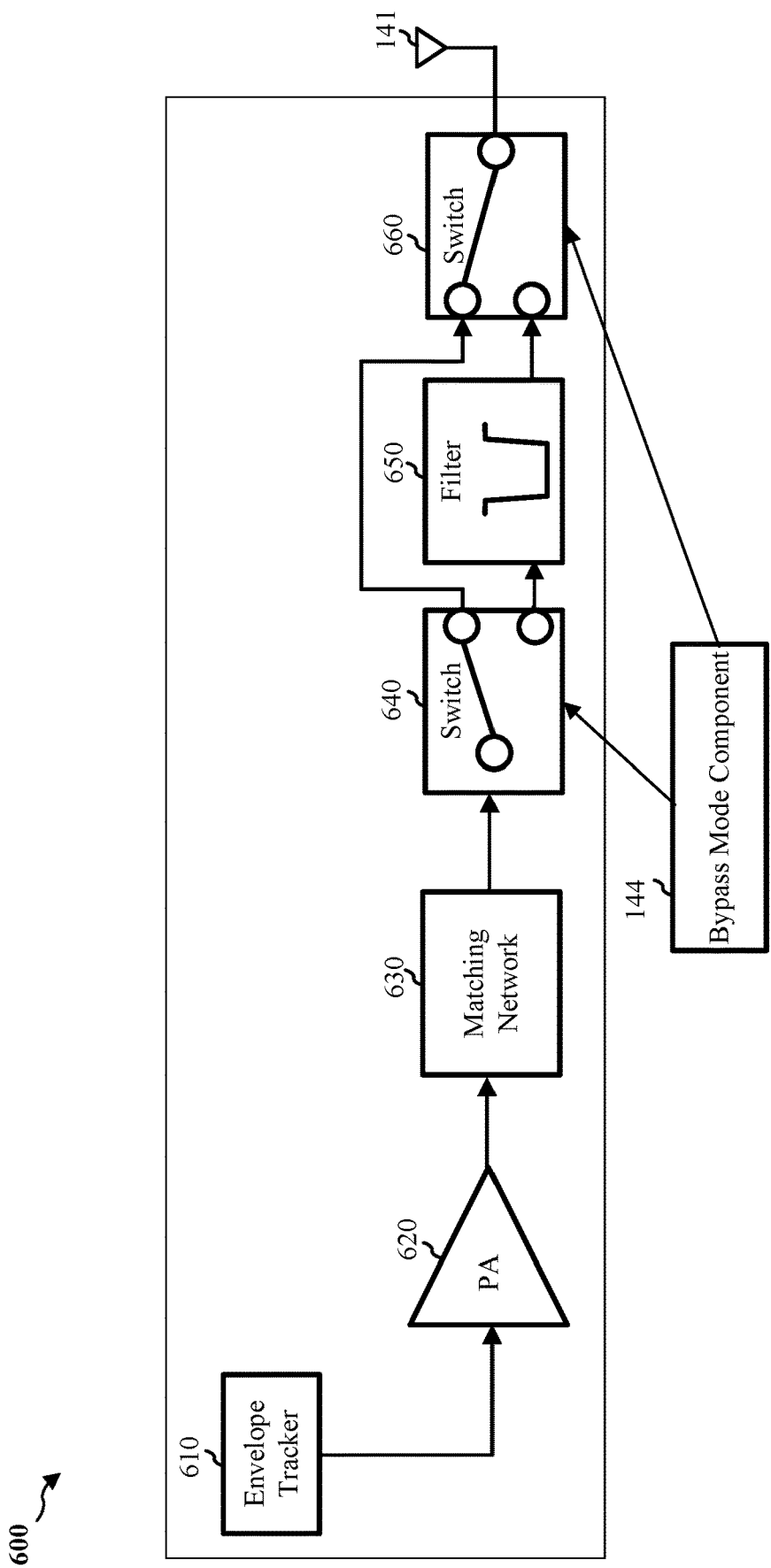
FIG. 6 is a block diagram of an example RF front end for a UE including a transmit filter bypass.

FIG. 6 is a block diagram of an example RF front end 600 including switches 640, 660 for bypassing a filter 650. The example RF front end 600 may include an envelope tracker (ET) 610, a power amplifier (PA) 620, a matching network 630, a first switch 640, the filter 650, and a second switch 660. The ET 610 may continuously adjust the power supply voltage applied to the PA 620. The matching network 630 may match an impedance between the PA 620 and the antenna 141.

The first switch 640 and the second switch 660 may receive a signal from the bypass mode component 144 indicating whether to operate in a filtered mode or a filter bypass mode. When in the filtered mode, the first switch 640 may provide the transmit signal to the filter 650, and the second switch 660 may receive the filtered signal from the filter 650. When in the filter bypass mode (as illustrated), the first switch 640 may be connected to the second switch 660 such that the transmit signal is not filtered. The second switch 660 may provide the transmit signal to the antenna 141.

Figure 7:
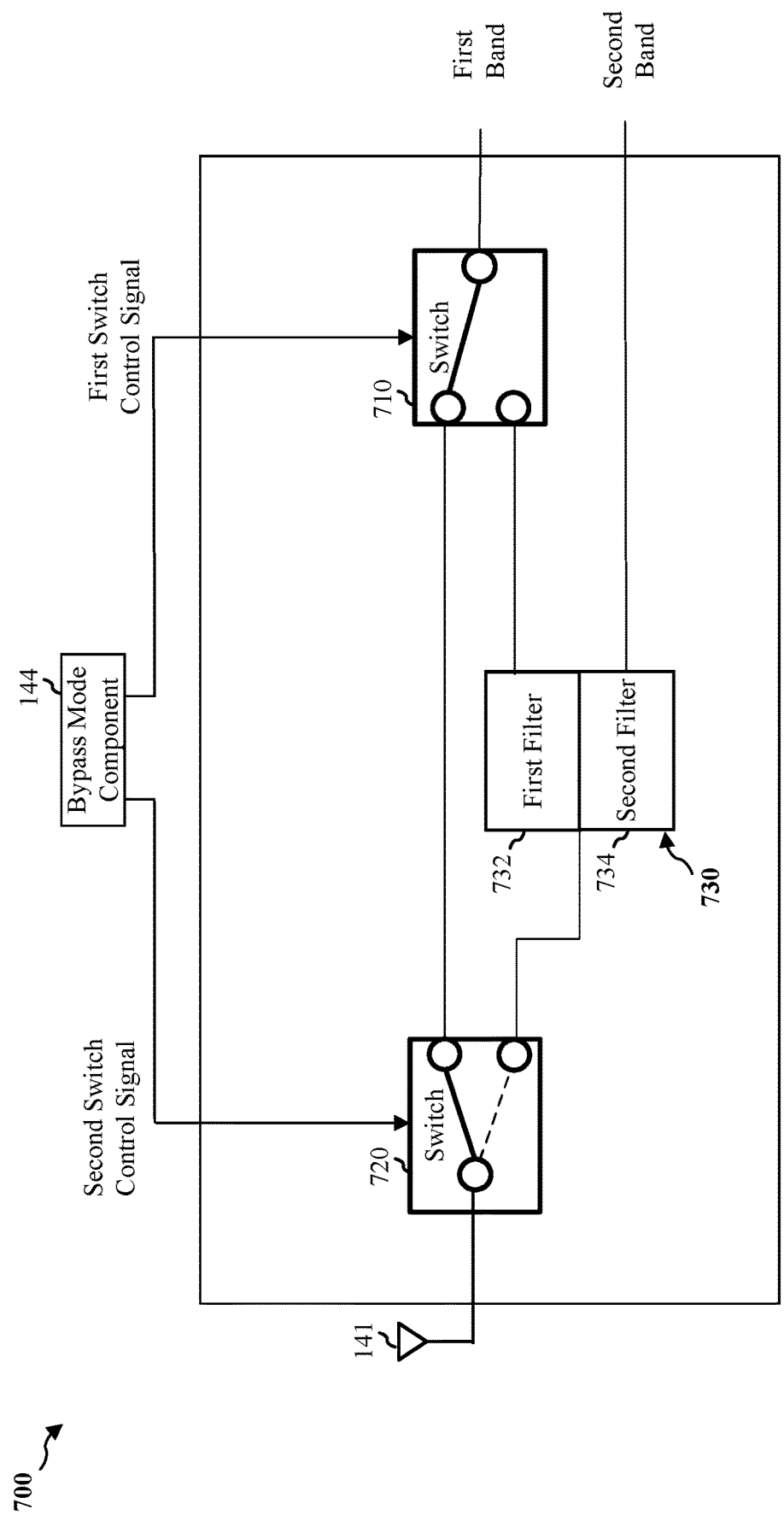
FIG. 7 is a block diagram of an example RF front end with a signal extractor and a transmit filter bypass.

FIG. 7 is a block diagram of another example RF front end 700 including a signal extractor 730. The signal extractor 730 may be a combination of filters that are applied to multiple bands to isolate a particular signal. For example, the signal extractor 730 may include a first filter 732 that filters a first band and a second filter that filters a second band based on the results of the first filter. For instance, in the case of a transmission from an LTE band interfering with reception of a Wi-Fi signal, in a filtered mode, the first filter 732 may filter the transmit signal to reduce leakage to the Wi-Fi band. The second filter 734 may filter the received signal based on the results of the first filter 732 to extract a received Wi-Fi signal. In an aspect, when in a filter bypass mode, one or both of the first filter 732 and the second filter 734 may be bypassed. The bypass mode component 144 may generate a first switch control signal and a second switch control signal. For instance, the first switch 710 may be controlled by the first switch control signal to bypass the first filter 732, but the second switch 720 may be controlled by the second switch control signal to route the received signal to the second filter 734. Alternatively, the filter bypass mode may bypass the signal extractor 730.

Figure 8:
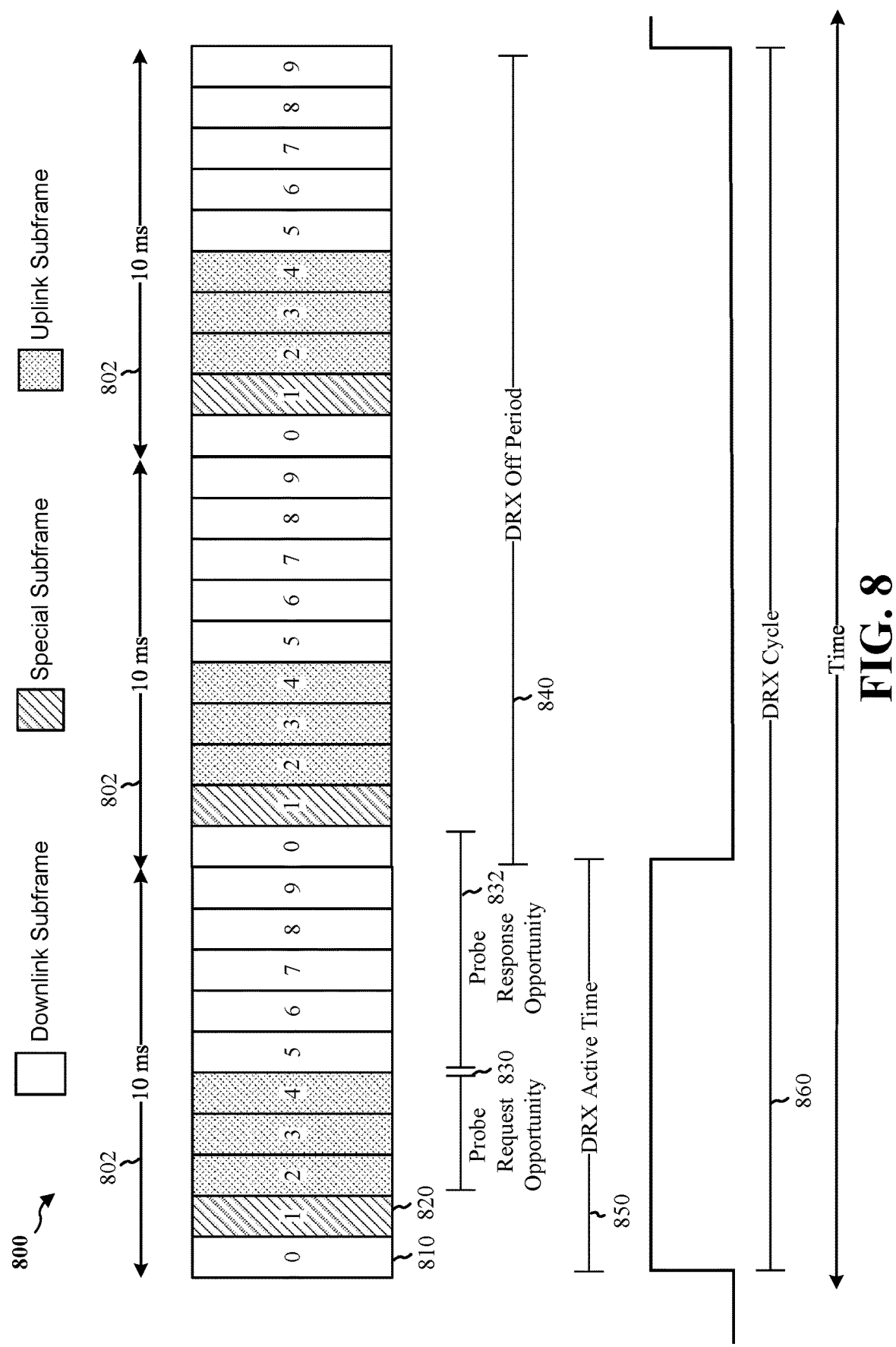
FIG. 8 is resource diagram of example time domain resources for scanning for a signal for a second radio access technology.

FIG. 8 is a resource diagram 800 illustrating time domain resources utilized for opportunistic scanning for a second RAT. For example, the first RAT may be LTE with TDD. Each 10 ms frame 802 may include 10 subframes with a direction indicated by a TDD configuration. PDCCH in downlink subframes provide downlink and/or uplink grants to the UE. For example, a PDCCH may be carried in the first subframe 810 in the downlink direction and indicate whether the UE 104 is to transmit in uplink subframes. A downlink grant may be carried in PDCCH of each downlink subframe (i.e., subframes 5,6,7,8, and 9). A special subframe 820 may include pilot signals for both uplink and downlink. In an aspect, a probe request opportunity 830 may occur in the uplink subframes (i.e., subframes 2, 3, and 4) of a frame where there is no downlink transmission to the UE. Accordingly, the UE 104 may transmit the probe request on the frequency band for the second RAT without interfering the receiver of the first RAT. The subsequent downlink subframes (i.e., subframes 5,6,7,8, 9, and 0) may be a probe response opportunity 832 for attempting to receive the probe response. Because of the TDD configuration, when the UE is not scheduled to receive in a downlink subframe, there is no uplink transmission either. Accordingly, even though the UE may be operating in a filter bypass mode, the Wi-Fi receiver will not be jammed because no uplink signal is being transmitted. Therefore, the UE 104 may transmit a probe request and listen for a probe response during the remaining portion of the frame 802.

In another aspect, the UE 104 may be configured with connected mode discontinuous reception (C-DRX). C-DRX may configure a DRX off period 840 during which the UE 104 may not be scheduled for a downlink transmission nor an uplink transmission. A DRX off period 840 may be relatively longer than the downlink subframes of a frame 802. Accordingly, the UE 104 may utilize the DRX off period 840 as a probe request opportunity 830 and a probe response opportunity 832, or may scan for a periodic Wi-Fi beacon during the DRX off period 840. The C-DRX parameters may be configured to UE 104 by a base station 102 via a radio resource control (RRC) signaling. The parameters may include a DRX cycle 860, DRX active time 850 or on-duration, and inactivity timer among others. The UE may start the DRX off period 840 and go to sleep upon expiry of the inactivity timer.

In an aspect, similar probe opportunities may be available when the first RAT is 5G NR. Due to the slot formats for 5G NR TDD being able to change the direction of transmission at a symbol level, a base station 180 may include a scheduling component 198 that schedules the UE 104 with a slot format that provides a probe opportunity.

Figure 9:
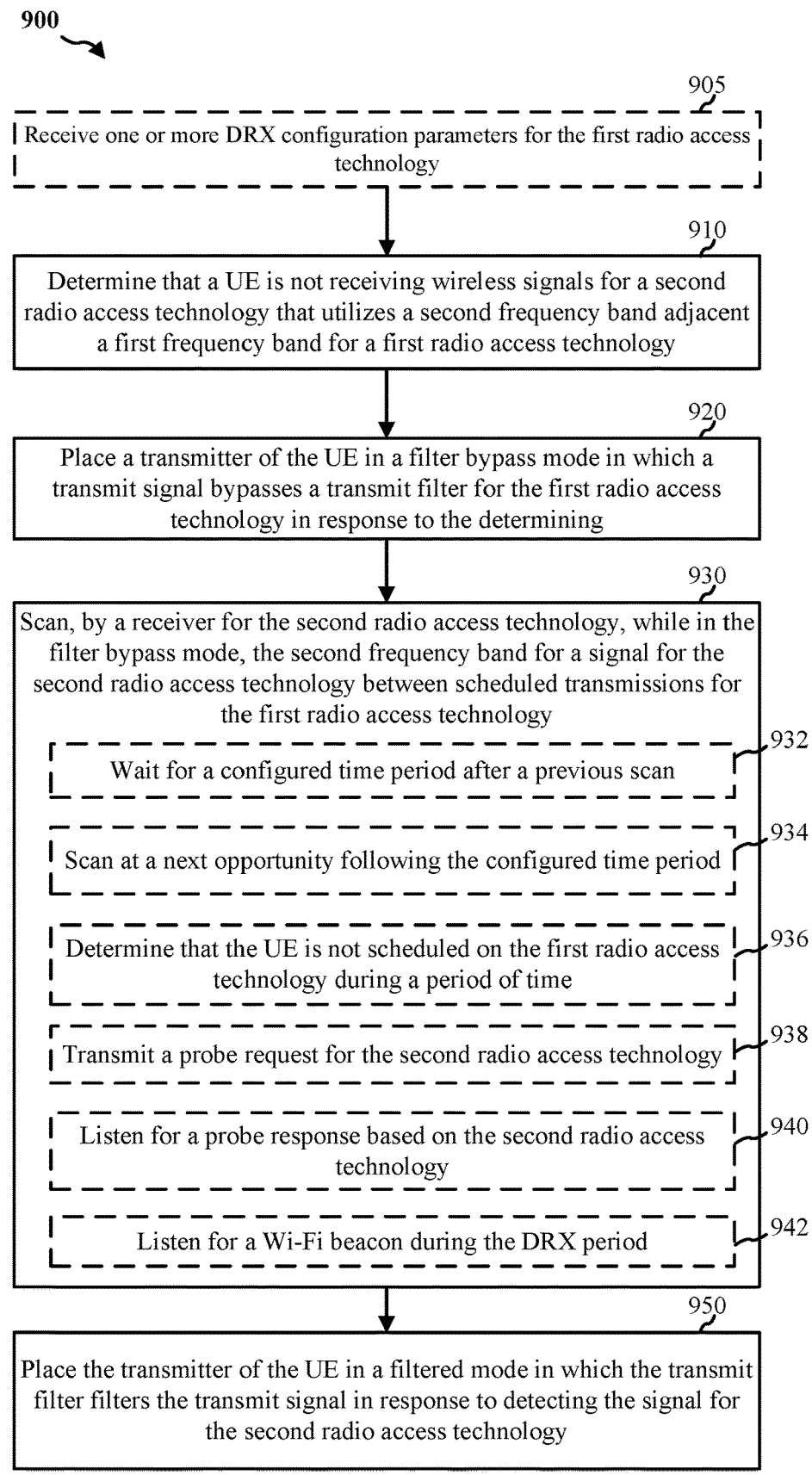
FIG. 9 is a flowchart of an example method of wireless communication.

FIG. 9 is a flowchart of a method 900 of wireless communication. The method 900 may be performed by a UE (e.g., the UE 104, which may include the memory 360 and which may be the entire UE 104 or a component of the UE 104 such as the filter bypass component 140, TX processor 368, the RX processor 356, and/or the controller/processor 359).

At block 905, the method 900 may optionally include receiving one or more DRX configuration parameters for the first radio access technology. In an aspect, for example, the UE 104, the processor 1012, the RX processor 356, and/or the controller/processor 359 may execute the filter bypass component 140 and/or the scanning component 148 to receive one or more DRX configuration parameters for the first radio access technology.

At block 910, the method 900 may include determining that a UE is not receiving wireless signals for a second radio access technology that utilizes a second frequency band adjacent to a first frequency band for a first radio access technology. In an aspect, for example, the UE 104, the processor 1012, the RX processor 356, and/or the controller/ processor 359 may execute the filter bypass component 140 and/or the scanning component 148 to determine that the UE 104 is not receiving wireless signals for a second RAT (e.g., Wi-Fi) that utilizes a second frequency band (e.g., band 430 or band 520) adjacent to a first frequency band (e.g., band 440 or band 510) for a first RAT (e.g., LTE or 5G NR). For instance, if the scanning component 148 does not receive a Wi-Fi beacon for a threshold amount of time (e.g., 5 seconds), the scanning component 148 may determine that the UE 104 is not receiving wireless signals for the second RAT. Accordingly, the UE 104, the processor 1012, the RX processor 356, and/or the controller/processor 359 executing the filter bypass component 140 and/or the scanning component 148 may provide means for determining that the UE is not receiving wireless signals for a second radio access technology that utilizes a second frequency band adjacent to a first frequency band for a first radio access technology.

At block 920, the method 900 may include placing a transmitter of the UE in a filter bypass mode in which a transmit signal bypasses a transmit filter for the first radio access technology in response to the determining. In an aspect, for example, the UE 104, the processor 1012, the TX processor 368, and/or the controller/processor 359 may execute the filter bypass component 140 and/or the bypass mode component 144 to place a transmitter of the UE 104 in a filter bypass mode in which a transmit signal bypasses the transmit filter (e.g., TX filter 146, filter 650, or signal extractor 730) for the first RAT in response to the determining in block 910. The transmitter of the UE 104 may include an RF front end such as the RF front end 600 or the RF front end 700. For instance, as illustrated in FIG. 6, the bypass mode component 144 may control the first switch 640 and the second switch 660 to place the RF front end 600 in the filter bypass mode. As another example, as illustrated in FIG. 7, the bypass mode component 144 may generate the first switch control signal and the second switch control signal to control the first switch 710 and the second switch 720 to place the RF front end 700 in the filter bypass mode. In the filter bypass mode, the bypass mode component 144 may control the transmitter 142 to satisfy a spectrum emission requirement for the first radio access technology. Accordingly, the UE 104, the processor 1012, the TX processor 368, and/or the controller/processor 359 executing the filter bypass component 140 and/or the filter mode component 144 may provide means for placing a transmitter of the UE in a filter bypass mode in which a transmit signal bypasses a transmit filter for the first radio access technology in response to the determining.

At block 930, the method 900 may include scanning, by a receiver for the second radio access technology, while in the filter bypass mode, the second frequency band for a signal for the second radio access technology between scheduled transmissions for the first radio access technology. In an aspect, for example, the UE 104, the processor 1012, the RX processor 356, and/or the controller/processor 359 may execute the filter bypass component 140 and/or the scanning component 148 to scan, by a receiver for the second radio access technology, while in the filter bypass mode, the second frequency band for a signal for the second radio access technology between scheduled transmissions for the first radio access technology. Accordingly, the UE 104, the processor 1012, the RX processor 356, and/or the controller/processor 359 executing the filter bypass component 140 and/or the scanning component 148 may provide means for scanning, by a receiver for the second radio access technology, while in the filter bypass mode, the second frequency band for a signal for the second radio access technology between scheduled transmissions for the first radio access technology.

For example, at sub-block 932, the block 930 may include waiting for a configured time period after a previous scan. In an aspect, for example, the scanning component 148 may be configured to periodically scan for the signal for the second RAT. In an implementation, the configured time period may be approximately 5 seconds, but other time periods may be selected. However, because the scanning component 148 and/or the receiver for the second RAT may be jammed by a transmission of the first RAT, the scanning component 148 may not start scanning immediately at the expiration of the configured time period. At sub-block 934, the block 930 may include scanning at a next opportunity following the configured time period. For instance, the next opportunity may be a probe request opportunity 830 or a DRX off period 840.

In an aspect, at sub-block 936, the block 930 may include determining that the UE is not scheduled on the first radio access technology during a period of time. For instance, the UE 104 may receive a PDCCH in the subframe 810 indicating that the UE 104 is not scheduled during subframes 2-4 (e.g., the PDCCH may not include a DCI having a CRC portion scrambled with a RNTI of the UE 104). Accordingly, the scanning component 148 may determine that subframes 2-4 are the probe request opportunity 830. Additionally, the UE 104 may receive a PDCCH in one or more of the subframes 5-9 indicating no downlink transmission for the UE. Accordingly, the scanning component 148 may determine that subframes 5-9 are the probe response opportunity 832. As another example, the scanning component 148 may determine that the UE 104 is not scheduled on the first radio access technology during the DRX off period 840 based on at least one or more DRX configuration parameters of a C-DRX configuration of the UE 104. That is, the DRX off period 840 may be configured via RRC signaling.

At sub-block 938, the block 930 may include transmitting a probe request for the second radio access technology. For instance, the scanning component 148 may transmit a Wi-Fi probe request when the second radio access technology is Wi-Fi. The Wi-Fi probe request may be a Wi-Fi management frame that indicates a specific service set identifier (SSID) or a wildcard SSID of a Wi-Fi AP. The Wi-Fi probe request may include attributes of the UE 104 to be supported. A Wi-Fi AP (e.g., AP 150) may respond to the Wi-Fi probe request with a probe response. At sub-block 940, the scanning component 148 may listen for the probe response based on the second radio access technology. For example, for Wi-Fi, the probe response may be another management frame including information about the AP 150 such as SSID, supported rates, and other fields defined by the applicable IEEE 802.11 standard.

In another aspect, at block 942, the block 930 may include listening for a Wi-Fi beacon during the DRX period. The Wi-Fi beacon may be another management frame that includes information about the AP 150 similar to the probe response. Since the Wi-Fi beacon is transmitted periodically, the scanning component 148 may utilize the longer opportunity of the DRX off period 840 to passively scan for an AP by listening for the Wi-Fi beacon.

At block 950, the method 900 may include placing the transmitter of the UE in a filtered mode in which the transmit filter filters the transmit signal in response to detecting the signal for the second radio access technology. In an aspect, for example, the UE 104, the processor 1012, the TX processor 368, and/or the controller/processor 359 may execute the filter bypass component 140 and/or the bypass mode component 144 to place the transmitter of the UE in the filtered mode in which the TX filter 146 filters the transmit signal in response to detecting the signal for the second radio access technology. Accordingly, the UE 104, the processor 1012, the TX processor 368, and/or the controller/processor 359 executing the filter bypass component 140 and/or the bypass mode component 144 may provide means for placing a transmitter of the UE in the filter bypass mode in which a transmit signal bypasses a transmit filter for the first radio access technology in response to the determining.

Figure 10:
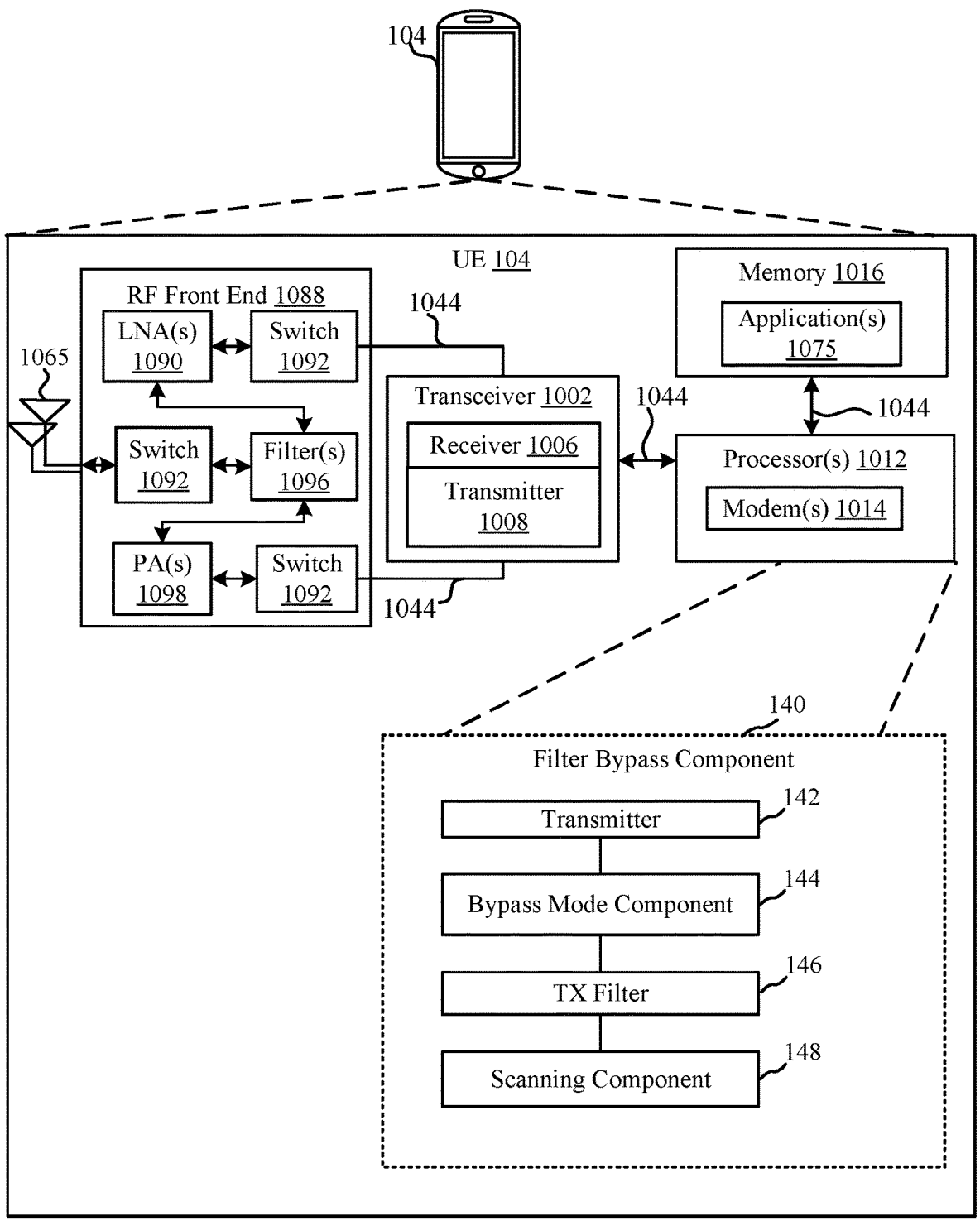
FIG. 10 is a schematic diagram of example components of the UE of FIG. 1.

Referring to FIG. 10, one example of an implementation of UE 104 may include a variety of components, some of which have already been described above, but including components such as one or more processors 1012 and memory 1016 and transceiver 1002 in communication via one or more buses 1044, which may operate in conjunction with modem 1014, and filter bypass component 140 to enable one or more of the functions described herein related to detecting a signal for a second RAT while in a filter bypass mode. Further, the one or more processors 1012, modem 1014, memory 1016, transceiver 1002, RF front end 1088 and one or more antennas 1065 may be configured to support voice and/or data calls (simultaneously or non-simultaneously) in one or more radio access technologies. The antennas 1065 may include one or more antennas, antenna elements, and/or antenna arrays.

In an aspect, the one or more processors 1012 may include a modem 1014 that uses one or more modem processors. The various functions related to filter bypass component 140 may be included in modem 1014 and/or processors 1012 and, in an aspect, may be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with filter bypass component 140 may be performed by transceiver 1002.

Also, memory 1016 may be configured to store data used herein and/or local versions of applications 1075, filter bypass component 140 and/or one or more of subcomponents thereof being executed by at least one processor 1012. Memory 1016 may include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining filter bypass component 140 and/or one or more of subcomponents thereof, and/or data associated therewith, when UE 104 is operating at least one processor 1012 to execute filter bypass component 140 and/or one or more subcomponents thereof.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. RF front end 1088 may be connected to one or more antennas 1065 and may include one or more low-noise amplifiers (LNAs) 1090, one or more switches 1092, one or more power amplifiers (PAs) 1098, and one or more filters 1096 for transmitting and receiving RF signals.

In an aspect, LNA 1090 may amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 may be used by RF front end 1088 to filter a received signal to obtain an input RF signal. Similarly, in an aspect, for example, a respective filter 1096 may be used to filter an output from a respective PA 1098 to produce an output signal for transmission. In an aspect, each filter 1096 may be connected to a specific LNA 1090 and/or PA 1098. In an aspect, RF front end 1088 may use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver 1002 may be tuned to operate at specified frequencies such that UE 104 can communicate with, for example, one or more base stations 102 or one or more cells associated with one or more base stations 102. In an aspect, for example, modem 1014 may configure transceiver 1002 to operate at a specified frequency and power level based on the UE configuration of the UE 104 and the communication protocol used by modem 1014.

In an aspect, modem 1014 may be a multiband-multimode modem, which can process digital data and communicate with transceiver 1002 such that the digital data is sent and received using transceiver 1002. In an aspect, modem 1014 may be multiband and be configured to support multiple frequency bands for a specific communications protocol. In an aspect, modem 1014 may be multimode and be configured to support multiple operating networks and communications protocols. In an aspect, modem 1014 may control one or more components of UE 104 (e.g., RF front end 1088, transceiver 1002) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 11:
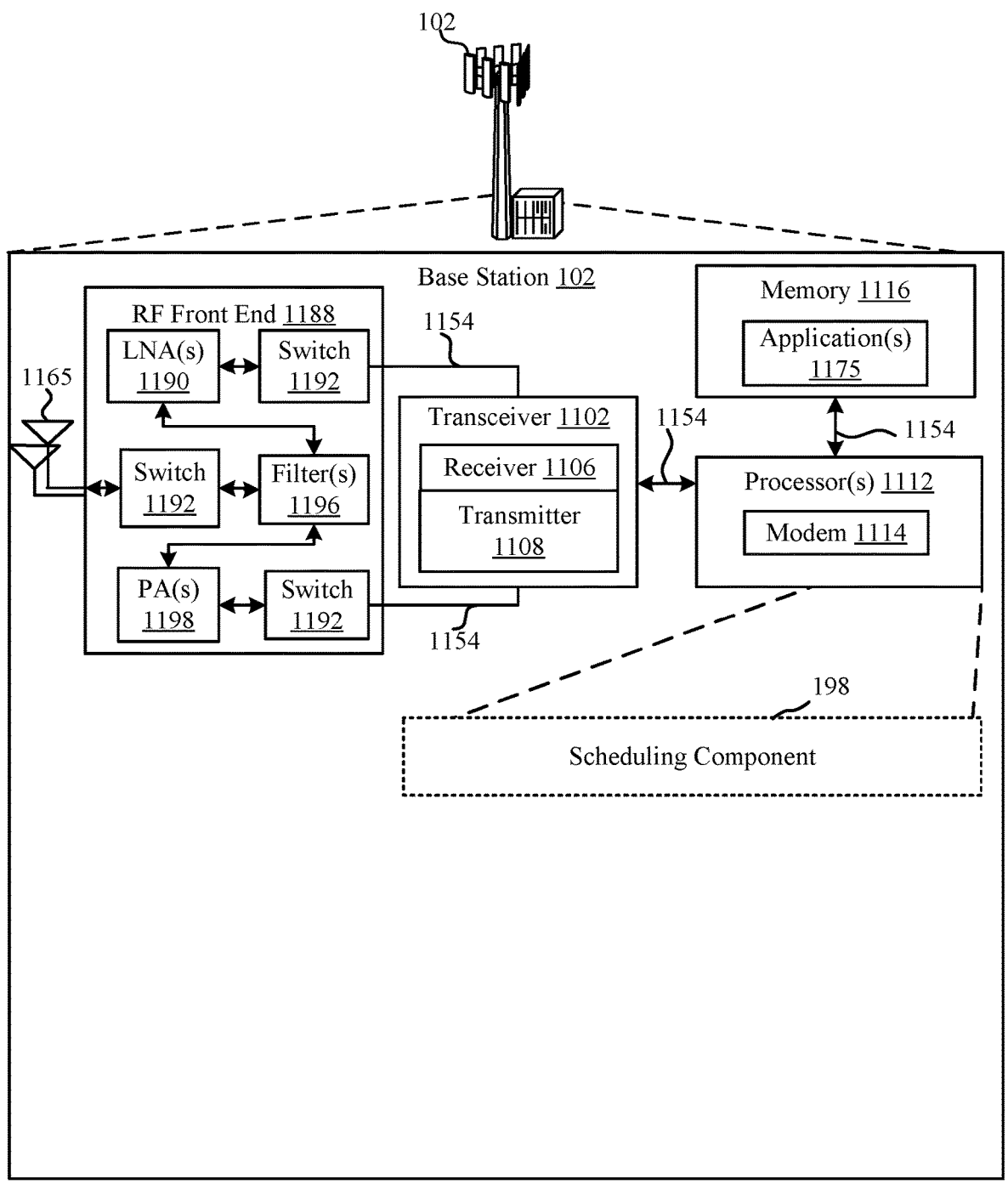
FIG. 11 is a schematic diagram of example components of the base station of FIG. 1.

Referring to FIG. 11, one example of an implementation of base station 102 may include a variety of components, some of which have already been described above, but including components such as one or more processors 1112 and memory 1116 and transceiver 1102 in communication via one or more buses 1154, which may operate in conjunction with modem 1114 and scheduling component 198 to enable one or more of the functions described herein related to detecting a signal for a second RAT while bypassing a transmit filter.

The transceiver 1102, receiver 1106, transmitter 1108, one or more processors 1112, memory 1116, applications 1175, buses 1154, RF front end 1188, LNAs 1190, switches 1192, filters 1196, PAs 1198, and one or more antennas 1165 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method of wireless communication, comprising:
using a first radio access technology and a second radio access technology, the second radio access technology utilizes a second frequency band adjacent to a first frequency band for the first radio access technology;
receiving one or more time division duplexing (TDD) configuration parameters for the first radio access technology;
determining that the UE is not scheduled on the first radio access technology during at least one downlink subframe based on at least the one or more TDD configuration parameters;
placing a transmitter of the UE in a filter bypass mode in which a transmit signal bypasses a transmit filter for the first radio access technology in response to the determining; and
scanning, by a receiver for the second radio access technology, while in the filter bypass mode, the second frequency band for a signal for the second radio access technology during the at least one downlink subframe not scheduled on the first radio access technology.

2. The method of claim 1, wherein the scanning comprises:
transmitting a probe request for the second radio access technology; and
listening for a probe response based on the second radio access technology.

3. The method of claim 2, wherein the probe request is transmitted in an uplink subframe of the UE.

4. The method of claim 1, wherein the scanning comprises listening for the signal for the second radio access technology during the at least one downlink subframe not scheduled on the first radio access technology.

5. The method of claim 1, wherein determining that the UE is not scheduled on the first radio access technology during at least one downlink subframe comprises receiving a control channel indicating no downlink transmission for the UE for the at least one downlink subframe.

6. The method of claim 5, wherein the control channel comprises a downlink grant to the UE.

7. The method of claim 1, wherein the scanning further comprises listening for a Wi-Fi beacon during the at least one downlink subframe not scheduled on the first radio access technology.

8. The method of claim 1, wherein the scanning comprises:
waiting for a configured time period after a previous scan; and
scanning at a next opportunity following the configured time period.

9. The method of claim 1, wherein the first frequency band is an LTE band 41 at 2496 to 2690 MHz and the second frequency band is a Wi-Fi band at 2400-2483 MHz.

10. The method of claim 1, wherein the first frequency band is a NR band 91 at 4.4 GHz to 5 GHz and the second frequency band is a Wi-Fi band at 5.15 GHz to 8.835 GHz.

11. The method of claim 1, wherein the UE is configured to satisfy a spectrum emission requirement for the first radio access technology while in the filter bypass mode.

12. An apparatus for wireless communication, comprising:
a memory storing computer executable code; and
at least one processor coupled with the memory and configured to execute the code to:
use a first radio access technology and a second radio access technology, the second radio access technology utilizes a second frequency band adjacent to a first frequency band for the first radio access technology;
receive one or more time division duplexing (TDD) configuration parameters for the first radio access technology;
determine that the UE is not scheduled on the first radio access technology during at least one downlink subframe based on at least the one or more TDD configuration parameters;
place a transmitter of the UE in a filter bypass mode in which a transmit signal bypasses a transmit filter for the first radio access technology in response to the determining; and
scan, by a receiver for the second radio access technology, while in the filter bypass mode, the second frequency band for a signal for the second radio access technology during the at least one downlink subframe not scheduled on the first radio access technology.

13. The apparatus of claim 12, wherein the at least one processor is configured to:
transmit a probe request for the second radio access technology; and
listen for a probe response based on the second radio access technology.

14. The apparatus of claim 13, wherein the probe request is transmitted in an uplink subframe of the UE.

15. The apparatus of claim 12, wherein the at least one processor is configured to listen for the signal for the second radio access technology during the at least one downlink subframe not scheduled on the first radio access technology.

16. The apparatus of claim 12, wherein the at least one processor configured to determine that the UE is not scheduled on the first radio access technology during at least one downlink subframe comprises receiving a control channel indicating no downlink transmission for the UE for the at least one downlink subframe.

17. The apparatus of claim 16, wherein the control channel comprises a downlink grant to the UE.

18. The apparatus of claim 12, wherein the at least one processor is configured to listen for a Wi-Fi beacon during the at least one downlink subframe not scheduled on the first radio access technology.

19. The apparatus of claim 12, wherein the at least one processor is configured to:
wait for a configured time period after a previous scan; and
scan at a next opportunity following the configured time period.

20. The apparatus of claim 12, wherein the first frequency band is an LTE band 41 at 2496 to 2690 MHz and the second frequency band is a Wi-Fi band at 2400-2483 MHz.

21. The apparatus of claim 12, wherein the first frequency band is a NR band 91 at 4.4 GHz to 5 GHz and the second frequency band is a Wi-Fi band at 5.15 GHz to 8.835 GHz.

22. The apparatus of claim 12, wherein the UE is configured to satisfy a spectrum emission requirement for the first radio access technology while in the filter bypass mode.

23. An apparatus for wireless communication, comprising:
means for using a first radio access technology and a second radio access technology, the second radio access technology utilizes a second frequency band adjacent to a first frequency band for the first radio access technology;

means for receiving one or more time division duplexing (TDD) configuration parameters for the first radio access technology;

means for determining that the UE is not scheduled on the first radio access technology during at least one downlink subframe based on at least the one or more TDD configuration parameters;

means for placing a transmitter of the UE in a filter bypass mode in which a transmit signal bypasses a transmit filter for the first radio access technology in response to the determining; and means for scanning, by a receiver for the second radio access technology, while in the filter bypass mode, the second frequency band for a signal for the second radio access technology during the at least one downlink subframe not scheduled on the first radio access technology.

24. The apparatus of claim 23, wherein the means for scanning is configured to:
   transmit a probe request for the second radio access technology; and
   listen for a probe response based on the second radio access technology.

25. The apparatus of claim 24, wherein the probe request is transmitted in an uplink subframe of the UE.

26. The apparatus of claim 23, wherein the means for scanning is configured to:
   determine that the UE is not scheduled on the first radio access technology in at least one downlink subframe; and
   listen for the signal for the second radio access technology during the at least one downlink subframe not scheduled on the first radio technology.

27. The apparatus of claim 23, wherein the means for scanning is configured to receive a control channel indicating no downlink transmission for the UE for at least one downlink subframe.

28. The apparatus of claim 27, wherein the control channel comprises a downlink grant to the UE.

29. The apparatus of claim 23, wherein the means for scanning is configured to listen for a Wi-Fi beacon during the at least one downlink subframe not schedule on the first radio access technology.

30. A non-transitory computer-readable medium storing computer executable code, the code when executed by a processor causes the processor to:
   use a first radio access technology and a second radio access technology, the second radio access technology utilizes a second frequency band adjacent to first frequency band for the first radio access technology;
   receive one or more time division duplexing (TDD) configuration parameters for the first radio access technology;
   determine that the UE is not scheduled on the first radio access technology during at least one downlink subframe based on at least the one or more TDD configuration parameters;
   place a transmitter of the UE in a filter bypass mode in which a transmit signal bypasses a transmit filter for the first radio access technology in response to the determining; and
   scan, by a receiver for the second radio access technology, while in the filter bypass mode, the second frequency band for a signal for the second radio access technology during the at least one downlink subframe not scheduled on the first radio access technology.

* * * * *